Patented Sept. 1, 1925.

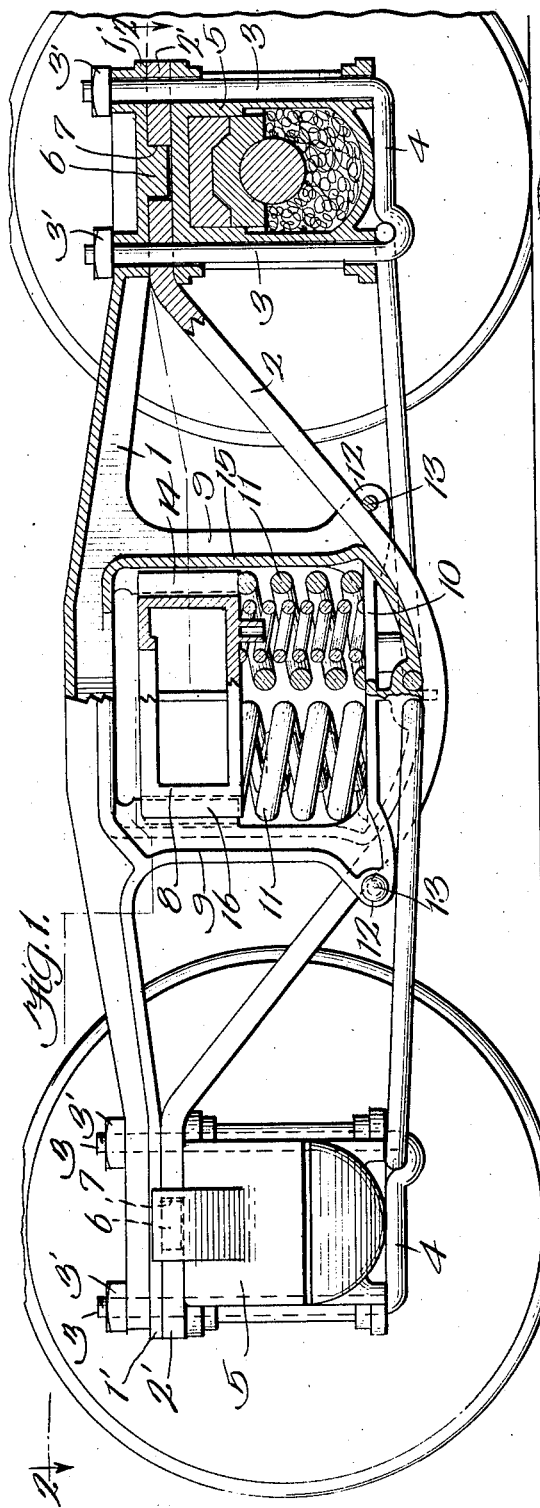

1,551,906

UNITED STATES PATENT OFFICE.

HERMAN C. PRIEBE, OF BLUE ISLAND, ILLINOIS.

CAR TRUCK.

Application filed July 26, 1924. Serial No. 728,363.

*To all whom it may concern:*

Be it known that I, HERMAN C. PRIEBE, a citizen of the United States, residing at Blue Island, in the county of Cook and the State of Illinois, have invented a certain new and useful Improvement in Car Trucks, of which the following is a full, clear, concise, and exact description.

My invention relates to car trucks and has a number of objects and advantages in view.

The invention, in one of its aspects, relates to those car trucks whose side frames include upper and lower arch bars having converged ends through which bolt structures are passed that support the journal boxes. These bolt structures are subject to shearing strains which I overcome by providing the converged ends of the arch bars with interengaging socket and plug formations which receive the shearing strains that would otherwise be imparted to the journal box supporting bolt structures.

The invention, in another of its characteristics, provides increased wearing surfaces between the truck bolsters and the guide bars therefor. To this end the truck bolsters and the guide bars are formed with upright interengaging tongue and groove formations which receive thrusts that are exerted laterally of the truck. These tongue and groove formations extend longitudinally of the truck and supplement other engaging portions that are preferably provided upon the truck bolster and guide bars also to receive thrusts laterally of the truck.

In accordance with another characteristic of the invention, the truck bolster guide bars are in supporting relation with the lower arch bars of the truck side frames, a result which is desirably secured by extending the guide bars below the lower surface of the lower arch bars and effecting supporting relation between the lower sides of the lower arch bars and the extended portions of the truck bolster guide bars.

The invention will be more fully explained in connection with the accompanying drawing in which Fig. 1 is a sectional view with parts in elevation, taken generally on line 1—1 of Fig. 2 and Fig. 2 is a plan view taken generally on line 2—2 of Fig. 1.

The truck side frame illustrated includes an upper arch bar 1 and a lower arch bar 2, the converged ends 1', 2' of these arch bars being penetrated by the upright bolts 3 whose lower ends are desirably joined by a connecting member 4 to constitute U bolts. The journal boxes 5 are penetrated by the upright bolts 3 and rest upon the connecting members 4, these bolts 3 passing through the arch bar ends 1', 2' to enable the arch bars to support the journal boxes, nuts 3' being screwed upon the upper ends of the bolts to clamp the journal boxes between the connecting members 4 and the converged ends of the arch bars. To relieve the bolts of shearing strains due to the tendency to relative movement of the converged ends of the arch bars, I form one of the arch bars, preferably the upper arch bar, with a plug portion 6 formed or cast integrally therewith, this plug portion being received in a socket 7 in the lower arch bar, the plugs and sockets being of such relative size as to relieve the bolts 3 of shearing strain.

The truck bolster 8 is desirably hollow. It projects at each end through a space which is defined by the upper arch bar 1, the bolster guide bars 9, which depend from the arch bar 1, being preferably formed integrally therewith and the lower and horizontal member 10, which connects the lower ends of the adjacent guide bars 9. Each member 10 constitutes a support for the truck bolster supporting springs 11. The bolster guide bars are formed with wings 12 which extend below the bottom surface of the lower arch bar 2 and carry bolts 13 which engage the bottom surface of the lower arch bar 2 to be in supporting relation with this bar. The horizontal connecting member 10 for each pair of bolster guide bars desirably engages the top side of the corresponding lower arch bar 2 so as to co-operate with the underlying bolts 13 in holding the lower arch bar in proper relation with the bolster guide bars.

The walls of the hollow bolsters 8 and the depending guide bars 9 are formed in convolutions to provide interengaging upright tongue and groove portions 14 and 15 that extend longitudinally of the truck and afford broad lateral surfaces to receive the thrusts that are exerted laterally of the truck. The bolster 8 is also formed with side wings 16 engaging the sides of the bolster guide bars and forming with the portions therebetween, upright grooves which receive the bolster guide bars, the portion 16 also receiving thrusts exerted laterally of the truck, these portions constituting side walls of the groove receiving the guide bars.

Changes may be made without departing from my invention.

Having thus described my invention, I claim:—

1. A truck side frame including an upper casted arch bar and a lower arch bar, said arch bars converging towards their ends and including parallel end portions arranged in superimposed relation, a journal box, a bolt structure passing through the parallel end portions of said arch bars and attaching the journal box to said frame, the end portion of said lower arch bar having an opening formed therethrough, and a lug formed on said upper arch bar received in said opening to interlock said bars whereby said bolt structure is relieved of shearing strains due to a tendency of said parallel end portions to move longitudinally in opposite directions as well as laterally under the influence of loads imposed on said frame, the sides of said opening and said lug being perpendicular to the parallel end portions of said arch bars whereby any tendency of the interlock to cause separation of said end portions when loads are imposed on the frame is avoided.

2. A truck side frame including an upper casted arch bar and a lower arch bar, said arch bars converging towards their ends and including parallel end portions arranged in superimposed relation, a journal box, a bolt structure passing through the parallel end portions of said arch bars and attaching the journal box to said frame, the end portion of said lower arch bar having an opening of less width than said end portion formed therethrough, and a lug formed on said upper arch bar received in said opening to interlock said bars whereby said bolt structure is relieved of shearing strains due to a tendency of said parallel end portions to move longitudinally in opposite directions under the influence of loads imposed on said frame.

3. In a truck, a side frame including a truck bolster guide bar, a truck bolster guided by said bar, side wings carried by said truck bolster engaging opposite sides of said guide bar, and an interlock between said guide bar and said bolster relieving said wings of excess strain and wear, said interlock being formed by a tongue on said bolster engaging a groove in said guide bar.

4. In a truck, a side frame including a truck bolster guide member, a bolster member guided by said guide member, side wings carried by one of said members engaging opposite sides of the other member, and an interlock between said members relieving said wings of excess strain and wear, said interlock being formed by a tongue on one of said members engaging a groove in the other member.

In witness whereof, I hereunto subscribe my name.

HERMAN C. PRIEBE.